Jan. 26, 1954     L. M. CHRISTENSEN     2,667,499
METHOD OF PROCESSING SAFFLOWER SEED
Filed Oct. 31, 1950
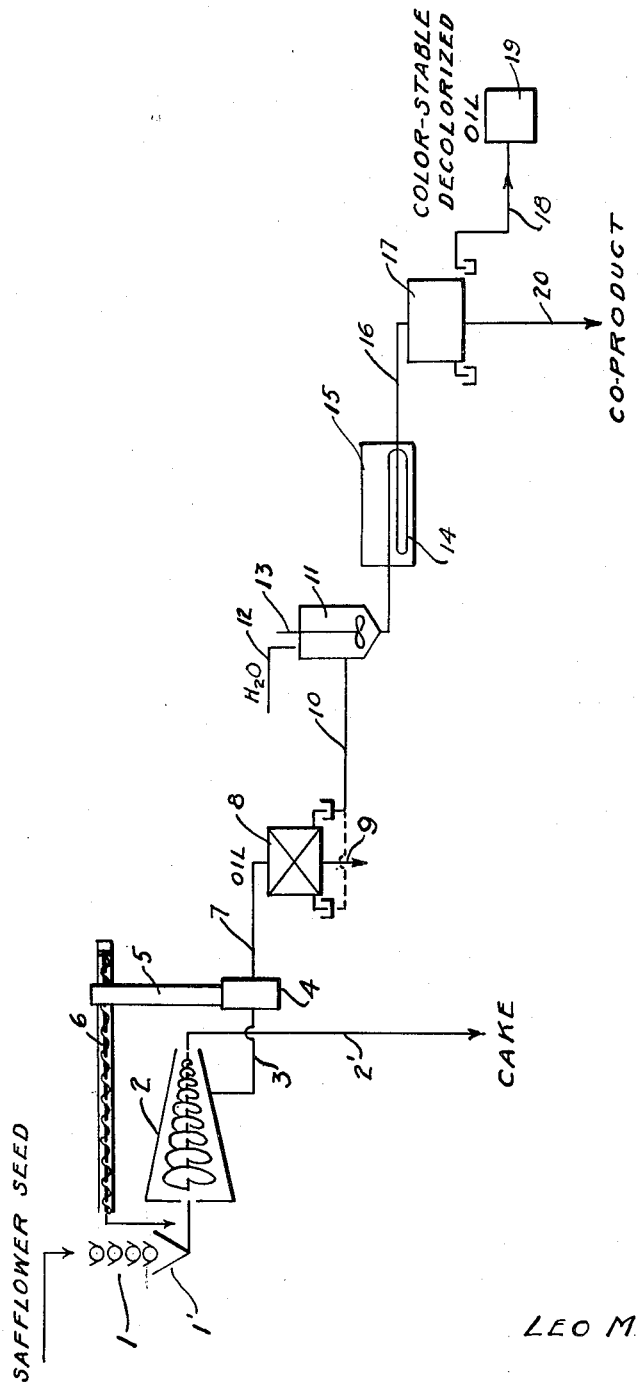
INVENTOR
*LEO M. CHRISTENSEN*
BY Raymond J. Norton
ATTORNEY Patented Jan. 26, 1954

2,667,499

UNITED STATES PATENT OFFICE 2,667,499

METHOD OF PROCESSING SAFFLOWER SEED

Leo M. Christensen, Lincoln, Nebr., assignor of fifteen per cent to Raymond J. Norton, Washington, D. C.

Application October 31, 1950, Serial No. 193,254

9 Claims. (Cl. 260—412.2)

1

This invention relates to a method of processing safflower seed, more particularly to a method of recovering from safflower seed an oil of stable color characteristics and a valuable co-product.

Safflower has been produced from very early times as a source of drugs and dyes from the flower and in more recent times for the oil content of the seed.

Safflower oil has been known to paint technologists for a considerable period and is quite fully discused in technical literature extending back over several decades. While there is considerable discussion of safflower oil in such literature, the knowledge in this country was largely academic since there was no production of truly commercial quantities. It was not until 1949 that the production in this country was large enough to warrant commercial processing of the crop. In this year some forty thousand acres were cultivated, representing the equivalent of about ten million pounds of oil.

It has been known that the oil content of safflower seed varies due to varietal differences, climatic conditions and conditions of cultivation. As a general rule the variations in oil content of the seed presently grown in this country range from about 26 to 37%; protein content from about 15 to about 22%; moisture from about 6 to about 10% and hulls from about 35 to about 50%. The general properties of the oil are known and are reported in the technical literature. Among the outstanding characteristics of the oil is the high content of linoleic acid and the practical absence of linoleic acid. Because of this, paints formulated with safflower oil do not yellow with age to any appreciable extent. The chemical and physical characteristics of safflower oil as reported in the literature show the variations and discrepancies that are expectable from the different varieties tested and the different analytical methods employed.

The oil may be recovered from the seed by any of the usual methods such as by expressing the oil in a continuous screw press. When the moisture content, temperature in the process and other factors are properly controlled the expressed oil is a bright golden color. The normal color bodies apparently are preponderantly carotenoids which are thermolabile; for this reason the safflower oil may be effectively decolorized by simply decomposing the carotenoids. This may be done, for example, by holding the oil at a temperature of about 485° F. for a period of five minutes; this results in improving the color from 8 to 1-2 on the Gardner scale.

2

In intensive investigations of this oil a characteristic has been discovered which, as far as is ascertainable, was not previously known and which is unreported in the literature. This characteristic, which for the sake of a term will be called a colormetric factor, has profound significance particularly with respect to the commercial value of the oil.

In the course of these investigations it was discovered that for some reason, not previously known but evidently involving some fundamental metabolic factor, some oil contained a compound or complex which in effect is a potential or incipient color forming material. Curiously enough such compound or complex is not a color body in the connotation that that term is generally used in the vegetable oil field but it is a substance or substances present in but very minor quantities in the oil as expressed or extracted which has no discernible tinctorial value per se, like carotenoids for example, but which nevertheless under certain conditions, particularly under certain thermal conditions profoundly changes the color of the whole body of oil.

The present invention is based on the discovery of the presence of this potential or incipient color imparting material and the development of an eminently simple and effective method of removing it.

In order to enable a more ready comprehension of the invention, a flow sheet of the process is shown in the single figure of the accompanying drawings.

It will not be without interest in appreciating and evaluating the invention to record the background of the discovery of a heretofore unknown component of certain safflower oils. In the full scale production of this oil in a commercial plant the seeds were continuously charged to a suitable expeller, such as an Anderson expeller and the expressed oil was filtered. The oil as pressed and filtered and without any decolorizing treatment is a clear, limpid oil of light amber color. A tank car of such a light colored oil was shipped to a consignee who reported that on arrival the oil did not have the color specifications of the oil as shipped but was of a markedly brown color. Careful check of the previous shipping history of the particular tank car gave no clue as to why such a marked color transformation should have taken place. A similar check of the processing equipment established that there could have been no pick-up of extraneous color bodies. A very careful study of all the possible variables that might have influenced or effected this change in color elicited the fact that the seeds from which this particular batch of oil was expressed were grown largely on irrigated acreage.

Intensive experimentation was conducted to attempt to ascertain the character of the particular compound and if possible to effect its removal from the oil. Various expedients were tried with no success. The method which finally was developed proved to be as eminently simple as it was effective.

In the course of this experimentation it was ascertained that if the expressed oil was heated to a temperature of between 200° F. to 250° F. and filtered the oil acquired a rather deep brown color. When a similar sample of expressed oil was filtered, agitated with 0.4% by volume of water and then heated and filtered the filtrate was slightly brown. When the oil was heated with 0.6% of water by volume for a period of between 5 and 30 minutes at a temperature of between 75° F. and 200° F. and was filtered, the filtrate was a limpid light amber colored oil which maintained its color stability thereafter.

It is evident that the compound or compounds originally present and soluble in the oil and which subsequently caused the development of undesirable color is some form of unsaturated compound which can be hydrated stoichiometrically to form a compound insoluble in the oil and thus readily removable by filtration or equivalent liquid-solids separation method.

The profound commercial significance of the present invention can be appreciated when it is considered that in 1949 about half the acreage grown in safflower was irrigated which yielded 2000 pounds of seed per acre as compared to about 750 lbs. obtained from dry lands; the oil from irrigated acreage thus constituted the preponderant volume of oil produced.

It is to be noted that the discovery of the presence of a potential color forming component or components in the oil is the more surprising because the investigators who have reported on the characteristics and properties of safflower oil were all in agreement that one of the major advantages of this oil, as compared to linseed for example, was its light color and the retention of the light color throughout the cooking process.

As indicated, the process is as simple as it is effective and economical. The essential decolorizing reagent is water and the reaction conditions involve simply the application of heat for a relatively brief period of time. The decolorizing operation thus adds but little to the over all processing costs and insures not only an oil of light color and excellent color stability, but also the recovery of a valuable by-product.

In carrying out the process the safflower seed is drawn from charge bins and fed to a crushing machine such as the roller mill 1. Since a large proportion of the seed is made up of hulls, it is important as a practical matter to decorticate the seed. This may readily be done by screening and aspirating as indicated generally at 1'. In practical operations it is desirable to leave about 5% to 10% and preferably about 7% of hulls in the decorticated seed. This produces an excellent meal by-product stock feed of the order of 40% protein. The decorticated crushed seed is fed to any suitable type of expeller 2 such as an Anderson expeller in which the oil is expelled. When a particular plant is not equipped with a solvent extraction unit, the expeller is operated to express the maximum amount of oil.

The cake is discharged from the expeller and is conveyed to storage for bagging and shipment.

Oil expressed in the expeller 2 is passed continuously through the line 3 a suitable unit in which the foots are separated from the oil. This may be of any effective type and comprise the settler 4 in which the foots are permitted to settle. The settled foots are continuously removed by the drag conveyor 5. The foots are picked up by the screw conveyor 6 and are fed back to the roller mill 1.

The oil is passed from the foots separator through the line 7 to a filter 8. The filtered solids are removed from the filter as indicated at 9 and the filtered oil is discharged through line 10.

The filtered oil produced as described or by any equivalent method is then processed according to the invention to remove the potential color forming bodies. As explained this method comprises essentially converting the bodies which in their naturally occurring form are soluble in the oil into insoluble solids which may then be separated from the oil by simple filtration. This conversion is most effectively done by the simple expedient of hydrating these bodies. As shown, the oil is continuously, and preferably in metered amounts, passed through the line 10 to a vessel 11 in which it is agitated with a definite stoichiometrical amount of water or steam which may be admitted in the required regulated amount through line 12. The oil with the predetermined added volume of water is thoroughly agitated as by the agitator 13 and is passed continuously through the coil 14 located in any suitable heater 15 where it is heated to a predetermined temperature and retained at such temperature for the desired length of time. As will be appreciated, the heating apparatus 15 may comprise a preliminary heater in which the temperature of the oil is raised to approximately the desired temperature which preliminary heater is in circuit with, for example, a dowtherm unit in which the temperature of the oil and the retention period at the optimum temperature may be accurately established and maintained. Obviously in lieu of heating the oil in a continuous thruput as described, it may be done batch wise.

This treatment, as explained, is a chemical conversion in which the potential color forming bodies are hydrated with the stoichiometrical quantity of water to form a compound or complex which is insoluble in the oil. It has been found that the diminution in color intensity is substantially a linear function of the water added and that the optimum amount of water is 0.6% by volume of the oil with this added amount all the potential color-forming bodies or complex are hydrated and insolubilized. Addition of water in amounts above 0.6% effects no additional improvement in color of the oil. Effective insolubilizing of these undesirable components of the oil may be achieved by heating for a suitable period of time and involves a time-temperature relationship. Hydration may be effected by heating at a temperature range of from about 75° F. to 200° F. for from 10 to 30 minutes. It has been ascertained, as a result of extensive tests and operation, that a practical optimum treatment comprises holding the oil at a temperature of between 160 and 170° F. for a period of approximately 20 minutes. In these circumstances the hydrated complex precipitates in a granular-like rather than a gelatinous material and filters readily to produce a clarified oil.

The treated oil which now contains the color imparting complexes in suspension is passed continuously or intermittently through the line 16 to a suitable liquid-solids separator such as filter 17. Obviously other equivalent separators such as a suitable centrifuge may be employed. The oil filtrate is discharged through the line 18 to a storage receiver 19 and the insoluble hydrated product is removed as indicated at 20.

It is of interest to observe that the hydrated derivative of the potential color imparting complex or component is insoluble in the host oil whereas its precursor is completely soluble. The recovered hydrated product is most interesting. It is a pure white compound which is insoluble in water and slightly soluble in hydrocarbon solvents and acetone. The physical and chemical characteristics and properties have not as yet been completely determined but it would appear that it may be a sterol type compound which could have valuable technical application.

It will be appreciated that the specific method of hydrating the potential color forming bodies described above is given to typify any other equivalent method of insolubilizing these bodies and removing them from the oil. Such a hydration treatment may be effected at any suitable or convenient stage in the general processing operation and may be associated and correlated with other decolorizing treatments. For example, if a very light colored oil is desired, the filtrate from filter 17 may be heat-treated to decompose the carotenoids in the manner previously described or the heat treatment in the heater 15 may be carried out stepwise first to insure the insolubilizing of the potential color-imparting components of the oil and then at a temperature of about 495° F. for a retention period of five minutes to decompose the carotenoids after which the oil may be filtered.

The described operation has been found to be most effective in processing safflower seed to produce a light color-stable oil. The seed has certain physical characteristics which differentiate it from other oil bearing seeds. For example, as explained previously, it is desirable to only partially decorticate the seed. If the seed is completely decorticated it is found that in the expeller it is kneaded into a mushy-like mash which is difficult to force through the expeller and from which it is difficult to express the oil. By retaining a small amount of the hulls in the seed, the seeds do not mush or plasticize but retain a physical stiffness which greatly improves the thruput under the action of the screw of the expeller. Furthermore the retention of a certain amount of hulls greatly facilitates the removal of oil. While no precise explanation of this effect is offered, it would appear that the distributed hull fragments provide solid surfaces along which the oil can flow thus facilitating its removal from the meat. As a result of considerable tests and experience it has been found that from about 7% to about 10% of hulls constitute the optimum retained amount. Thus it will be understood that if a decorticating machine is employed which substantially completely decorticate the seed it will be found advantageous to feed back and uniformly disperse through the decorticated seed about 7 to 10% of the separated hulls. The removal of a substantial portion of hulls is therefore an important feature of the general processing procedure.

As previously indicated, insofar as is known, no one previously had described or suspected that potential color imparting bodies were present in safflower oil grown on irrigated land, or under other conditions wherein considerable moisture is taken up during growth of the plant. Since in the storage of harvested seeds in elevators, bins or other units no attempt is made to segregate the safflower seed grown on dry land from that grown on irrigated land, it will be seen that the described process is not only important but is applicable generally to the processing of safflower seed. The process is as eminently simple as it is effective and valuable. While the hydration treatment has been described as being carried out at a certain stage in the process, i. e., after preliminary filtration of the crude pressed oil, it will be appreciated that it may be effective at any other suitable stage in the process, for example, immediately after removal of the foots. However, it is desirable to operate as described so as to obtain the hydrated product from the second filter 17 in pure form, i. e., uncontaminated with the fines separated out in filter 8.

While preferred modifications of the process have been described, it will be understood that these are given to illustrate the discovery that potential color forming bodies are present in safflower oil grown under high moisture conditions and to teach the art how such undesirable constituents may be removed.

I claim:

1. A method of decolorizing safflower oil which comprises maintaining the oil at a temperature of the order of about 495° F. for a period of about five minutes.

2. A method of processing safflower which comprises separating the oil from the seed and hydrating the oil at a temperature of between about 75° F. and 200° F. for a period of between about five minutes and thirty minutes.

3. A method of processing safflower which comprises separating the oil from the seed adding approximately 0.6% of water to the oil maintaining the oil at a temperature of between 75° F. and 200° F. for a period of from about five to thirty minutes and filtering off the solid hydrated bodies.

4. A method of processing safflower which comprises separating the oil from the seed, adding approximately 0.6% of water to the oil and maintaining the oil at a temperature of between 160° F. and 170° F. for a period of approximately twenty minutes.

5. A method of processing safflower seed which comprises dehulling the seed under conditions controlled to remove about 90% of the hulls, subjecting the partially dehulled seed to mechanical pressure to express the oil therefrom, filtering the expressed oil and subjecting the oil to a heat treatment at a temperature of about 495° F. for a period of about 5 minutes to decompose the contained carotenoids.

6. A method of processing safflower seed which comprises partially dehulling the seed to remove approximately 90% of the hulls, expelling the oil from the partially dehulled seed, filtering the expressed oil, subjecting the oil to hydration with added water at elevated temperature to precipitate a solid hydrated component, and separating the precipitate from the oil.

7. A method of processing safflower seed which comprises partially dehulling the seed to remove approximately 90% of the hulls, expelling the oil from the partially dehulled seed, separating foots from the expelled oil, subjecting the oil to hydration in the presence of the equivalent of 0.6% of water at a temperature of between 75° F.

and 200° F. for a period of 10 to 30 minutes and then filtering the oil to remove precipitated components.

8. A process in accordance with claim 7 in which the filtered oil is heat treated at a temperature and for a time sufficient to decompose the carotenoids.

9. The product produced by the process of claim 1.

LEO M. CHRISTENSEN.

References Cited in the file of this patent

Lewkowitsch, J. I.: "Chemical Technology and Analysis of Oils Fats and Waxes," 4th edition, 1909, published by MacMillan and Company, London. Vol. II, pages 85-89, Vol. III, page 100.